US012429193B1

(12) United States Patent
Yu

(10) Patent No.: US 12,429,193 B1
(45) Date of Patent: Sep. 30, 2025

(54) HAND ILLUMINATING ASSEMBLY EASY TO DISASSEMBLE

(71) Applicant: Ouyang Yu, Shenzhen (CN)

(72) Inventor: Ouyang Yu, Shenzhen (CN)

( * ) Notice: Subject to any disclaimer, the term of this patent is extended or adjusted under 35 U.S.C. 154(b) by 0 days.

(21) Appl. No.: 19/062,096

(22) Filed: Feb. 25, 2025

(51) Int. Cl.

| | |
|---|---|
| ***F21V 17/10*** | (2006.01) |
| ***A41D 19/00*** | (2006.01) |
| ***A41D 19/015*** | (2006.01) |
| ***F21L 4/02*** | (2006.01) |
| ***F21V 17/12*** | (2006.01) |
| ***F21V 17/16*** | (2006.01) |
| ***F21V 19/00*** | (2006.01) |
| ***F21V 21/096*** | (2006.01) |
| ***F21V 23/04*** | (2006.01) |
| ***F21V 31/00*** | (2006.01) |
| ***F21V 31/03*** | (2006.01) |
| ***F21V 33/00*** | (2006.01) |

(52) U.S. Cl.
CPC ............ *F21V 17/105* (2013.01); *F21L 4/022* (2013.01); *F21V 17/164* (2013.01); *F21V 23/0414* (2013.01); *F21V 33/0008* (2013.01); *A41D 19/0013* (2013.01); *A41D 19/0017* (2013.01); *A41D 19/0034* (2013.01); *A41D 19/0037* (2013.01); *A41D 19/0157* (2013.01); *F21V 17/12* (2013.01); *F21V 19/0055* (2013.01); *F21V 21/096* (2013.01); *F21V 21/0965* (2013.01); *F21V 31/00* (2013.01); *F21V 31/005* (2013.01); *F21V 31/03* (2013.01)

(58) Field of Classification Search
CPC .. F21V 21/0965; F21V 33/0008; F21V 17/12; F21V 19/0055; F21V 31/00; F21V 31/005; F21V 31/03; A41D 19/0013; A41D 19/0017; A41D 19/0034; A41D 19/0037; A41D 19/0157
See application file for complete search history.

(56) References Cited

U.S. PATENT DOCUMENTS 1,230,943 A * 6/1917 Sundh ................ A41D 19/0157 116/35 R
9,170,009 B1 * 10/2015 Smith ........................ F21L 4/02
12,098,837 B1 * 9/2024 Li ........................ F21V 33/0008
(Continued)

FOREIGN PATENT DOCUMENTS

WO WO-2024001556 A1 * 1/2024

OTHER PUBLICATIONS

Machine translation of WO 2024001556 A1 retrieved from the FIT database of PE2E search. (Year: 2025).*

*Primary Examiner* — Colin J Cattanach
(74) *Attorney, Agent, or Firm* — Nicholas Makridakis

(57) ABSTRACT

Disclosed is a hand illuminating assembly easy to disassemble, including a reference panel, where the reference panel has a first end, a second end, a first side, a second side, a top surface, and a bottom surface, an inner arc surface of the reference panel is movably sleeved with a hand body, the reference panel is arranged on a top of the hand body, a finger sleeve located on one side of the first side is connected to the second end, a thumb sleeve located on one side of the second end is connected to the second side, holes capable of accommodating the hand body is formed on tops of the finger sleeve and the thumb sleeve, an actuator is connected to the top surface of the reference panel, a light emitter is connected to the top surface of the thumb sleeve and the finger sleeve.

9 Claims, 8 Drawing Sheets

11

(56) References Cited

U.S. PATENT DOCUMENTS

| | | | | |
|---|---|---|---|---|
| 2008/0062676 | A1* | 3/2008 | Masuda | A41D 19/0024 362/103 |
| 2008/0218996 | A1* | 9/2008 | Galloway | G08B 5/006 315/291 |
| 2010/0269239 | A1* | 10/2010 | Kulp | A41D 27/08 2/244 |
| 2015/0074868 | A1* | 3/2015 | Mack | A41D 19/001 2/161.1 |
| 2016/0003703 | A1* | 1/2016 | Chien | F21V 25/12 73/40.7 |
| 2020/0217496 | A1* | 7/2020 | Dir | F21V 19/0055 |

* cited by examiner

11

HAND ILLUMINATING ASSEMBLY EASY TO DISASSEMBLE

TECHNICAL FIELD

The present disclosure belongs to the field of hand illuminating technology, and particularly relates to a hand illuminating assembly easy to disassemble.

BACKGROUND

The foundation of illuminating gloves lies in the gloves themselves, which are made from various material, including but not limited to cotton, leather, synthetic fibers, and the like. The material is chosen based on comfort, flexibility, and durability. For example, cotton gloves are soft, comfortable, and breathable, making them suitable for long-term wear. The design of gloves follows an anatomical structure of human hands, with finger parts shaped to fit fingers, allowing a user to naturally bend the fingers to perform various gripping actions and other tasks. A control circuit enables the functions, such as adjusting a brightness of LED lights and controlling a flashing mode. Some illuminating gloves also allow the user to control an illuminating status via a touch sensor or button.

The U.S. patent (Publication No. U.S. Pat. No. 8,523, 377B1) discloses an injection model, key points of the technical solution therein are: an illuminating assembly for allowing hands free illumination of an area includes a panel which has a first end, a second end, a first lateral edge, a second lateral edge, a top surface and a bottom surface. A wrist coupler is attached to the first end. A finger sleeve is attached to the second end. The finger sleeve is positioned adjacent to the first lateral edge. A light emitter is attached to the wearable light mount. The light emitter is directed away from the first end of the panel. An actuator is operationally coupled to the light emitter. The light emitter is turned on or off when the actuator is actuated. The actuator is attached to the wearable light mount.

However, the above technology often has the following defects: the illuminating device is mainly small lamp beads that are integrated into the glove. Once the battery power is exhausted during use, the user cannot replace the battery on site in a timely and rapid manner, as the battery is firmly enclosed inside the device using the integrated packaging. Moreover, since the glove is closely connected to the illuminating device, when one of the components thereof goes wrong, the entire illuminating device has to be discarded, which poses a significant burden on both the use experience for individual consumers and the budget planning for enterprises purchasing the illuminating device in batches. As a result, the practicality and cost-effectiveness of the illuminating device are seriously limited.

To this end, the present disclosure provides a hand illuminating assembly easy to disassemble to solve the above problems.

SUMMARY

The present disclosure aims to overcome the shortcomings in the prior art and solve at least one technical problem in the background.

A technical solution adopted by the present disclosure to solve the technical problems is as follows: a hand illuminating assembly easy to disassemble, including a reference panel, where the reference panel has a first end, a second end, a first side, a second side, a top surface, and a bottom surface, an inner arc surface of the reference panel is movably sleeved with a hand body, the reference panel is arranged on a top of the hand body, a finger sleeve is connected to the second end of the reference panel, the finger sleeve is located on one side of the first side, a hole capable of accommodating the hand body is formed on a top of the finger sleeve, a thumb sleeve is connected to the second side of the reference panel, the thumb sleeve is located on one side of the second end, a hole capable of accommodating the hand body is also formed on a top of the thumb sleeve, an actuator is connected to the top surface of the reference panel, a light emitter is connected to the top surface of the thumb sleeve and the finger sleeve, the light emitter faces away from the first end of the reference panel, the light emitter is located near the second side, a magnetic block is sewn inside the glove near two light emitters and the actuator, an iron sheet body is mounted at a bottom of each of the two light emitters, and a magnetic sticker is arranged at a bottom of the actuator.

Sewing thread is arranged on front ends of the thumb sleeve and the finger sleeve near an end surface of the second side, the sewing thread is mounted on the first side, and through holes are formed at four corners of an upper surface of the light emitter.

An inner arc surface of each of the through holes is connected to a nut head by means of through connection, an outer arc surface at a bottom end of the nut head is sleeved with a gasket, a surface of the gasket is placed inside the through hole.

The iron sheet body is fixedly mounted on the bottom end of the nut head, the iron sheet body is adsorbed and connected to the magnetic block, and the light emitter faces away from the first end of the reference panel.

The light emitter is turned on or off when the actuator is triggered, the actuator is connected to the reference panel of a wearable lighting bracket, and a bottom plate is fixedly mounted on a lower surface of the actuator.

A supporting groove is formed on an upper surface of the bottom plate, a convex surface is formed on an outer arc surface of the supporting groove, an upper surface of the supporting groove is movably overlapped with a fixed plate, and a supporting portion is formed on an outer arc surface of the fixed plate.

An outer arc surface of the supporting portion is overlapped with the convex surface, a magnetic sticker is connected with an upper surface of the fixed plate by means of through connection, a lower surface of the magnetic sticker is connected with a bottom cover, and the bottom cover is fixedly mounted on the bottom plate.

An upper cover plate is fixedly mounted on one side of the reference panel close to the top surface, a column pin groove is formed on a lower surface of the upper cover plate, a snap-fit slot is formed on a bottom end of an outer arc surface of the column pin groove, and a pin is connected with an inner arc surface of the snap-fit slot by means of through connection.

An insertion block is arranged on each side of an outer arc surface of the pin, both ends of the insertion block pass through and extend into the column pin groove, a lower cover plate is arranged at a bottom end of the pin, and an upper surface of the lower cover plate is placed on the bottom surface of the reference panel.

A magnet sheet is sandwiched and connected between the upper cover plate and the lower cover plate, the magnet sheet is adsorbed and connected to the magnetic sticker, the upper cover plate is placed on the top surface, the lower cover plate is placed on the bottom surface, and the upper cover plate is connected to the lower cover plate.

The present disclosure has the following beneficial effects:

1. By arranging the magnet sheet and the magnetic sticker on the actuator, the present disclosure not only ensures that the actuator is closely matched with the components through the magnetic force in normal mounting and use, and also ensures that it can be easily detached during disassembly without causing any problems caused by the magnetic force, such as disassembly difficulties or damages to the components due to the existence of magnetic force, providing convenience for the disassembly and maintenance of the entire device.
2. By arranging the magnet sheet and the magnetic sticker on the light emitter, magnetic relationship between them is implemented without complex tools or tedious operating steps, which greatly improves the convenience and efficiency of disassembly, and it is convenient for a user to quickly and easily complete the disassembly of the light emitter in maintenance, replacement of parts of the device or other special demand scenarios.

BRIEF DESCRIPTION OF THE DRAWINGS

The present disclosure will be further described below with reference to the accompanying drawings.

Figure 1:
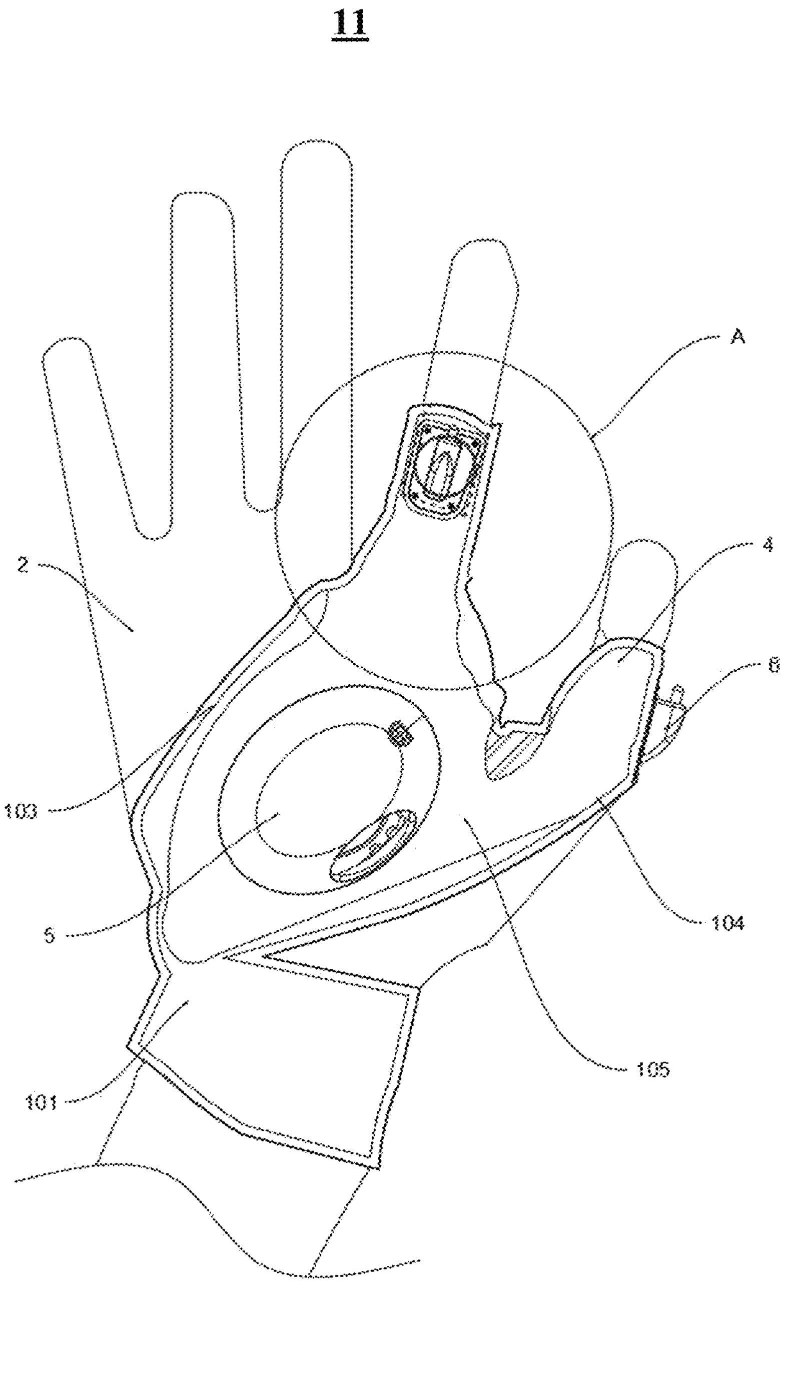
FIG. 1 is a plan view of a hand illuminating assembly according to the present disclosure.

Reference numerals in the accompanying drawings: 11. hand illuminating assembly (also named as a wearable lighting bracket hereinafter); 1. reference panel; 101. first end; 102. second end; 103. first side; 104. second side, 105. top surface; 106. bottom surface; 2. hand body; 3. finger sleeve; 4. thumb sleeve; 5. actuator; 501. bottom plate; 502. supporting groove; 503. convex surface; 504. fixed plate; 505. supporting portion; 506. magnetic sticker; 507. bottom cover; 6. light emitter; 601. through hole; 602. nut head; 603. gasket; 604. iron sheet body; 7. sewing thread; 8. magnetic block; 10. insertion block; 12. magnet sheet; 13. upper cover plate; 14. column pin groove; 15. snap-fit slot; 16. pin; and 17. lower cover plate.

DETAILED DESCRIPTIONS OF THE EMBODIMENTS

In order to make the technical means, inventive features, achieved objectives and effects of the present disclosure clear and understandable, the present disclosure is further described in combination with the specific implementations below.

As shown in FIGS. 1, 3, 4, 6, 7, and 8, a light emitter 6 is turned on or off when an actuator 5 in the embodiment of the present disclosure is triggered, the actuator 5 is connected to a reference panel 1 of a wearable lighting bracket, a bottom plate 501 is fixedly mounted on a lower surface of the actuator 5, a supporting groove 502 is formed on an upper surface of the bottom plate 501, a convex surface 503 is formed on an outer arc surface of the supporting groove 502, an upper surface of the supporting groove 502 is movably overlapped with a fixed plate 504, a supporting portion 505 is formed on an outer arc surface of the fixed plate 504, an outer arc surface of the supporting portion 505 is overlapped with the convex surface 503, a magnetic sticker 506 is connected with an upper surface of the fixed plate 504 by means of through connection, a lower surface of the magnetic sticker 506 is connected with a bottom cover 507, the bottom cover 507 is fixedly mounted on the bottom plate 501, an upper cover plate 13 is fixedly mounted on one side of the reference panel 1 close to the top surface 105, a column pin groove 14 is formed on a lower surface of the upper cover plate 13, a snap-fit slot 15 is formed on a bottom end of an outer arc surface of the column pin groove 14, a pin 16 is connected with an inner arc surface of the snap-fit slot 15 by means of through connection, an insertion block 10 is arranged on each side of an outer arc surface of the pin 16, both ends of the insertion block 10 pass through and extend into the column pin groove 14, a lower cover plate 17 is arranged at a bottom end of the pin 16, an upper surface of the lower cover plate 17 is placed on the bottom surface 106 of the reference panel 1, a magnet sheet 12 is sandwiched and connected between the upper cover plate 13 and the lower cover plate 17, the magnet sheet 12 is adsorbed and connected to the magnetic sticker 506, the upper cover plate 13 is placed on the top surface 105, the lower cover plate 17 is placed on the bottom surface 106, and the upper cover plate 13 is connected to the lower cover plate 17 in a clamping manner.

When mounting the upper cover plate 13 on the top surface 105 of the reference panel 1 of a glove, a plurality of the column pin grooves 14 are arranged on the lower surface of the upper cover plate 13, and the plurality of the column pin grooves 14 are hollow and with an opening on one side; and a reserved hole is formed at an original top surface 105 of the glove, allowing the column pin grooves 14 to be smoothly inserted into the bottom surface 106. When the column pin grooves 14 are inserted into the bottom surface 106, they can be connected to the lower cover plate 17. The lower cover plate 17 will be placed in a corresponding position when the upper cover plate 13 is mounted, the column pin grooves 14 pass through and are inserted into the pins 16 on the lower cover plate 17, the snap-fit slot 15 is formed on columns on both sides of each of the column pin groove 14, and the snap-fit slot 15 is capable of being snap-fitted with the insertion block 10 on both sides of each of the pins 16. By means of snap-fit connection, a connection between the upper cover plate 13 and the lower cover plate 17 can be effectively limited, thereby avoiding relative displacement due to external force during use, and ensuring the stability of the entire structure. In addition, the magnet sheet 12 is sandwiched between the two cover plates, and the magnet sheet 12 can provide magnetic force required for relevant functions or subsequent operations of the glove.

In addition, the bottom of the actuator 5 at an upper end is connected to the bottom plate 501, the supporting groove 502 is formed on the bottom plate 501, a main purpose of the supporting groove 502 is to precisely place the fixed plate 504, the convex surface 503 and the supporting portion 505 are respectively arranged on the supporting groove 502 and the fixed plate 504, they have identical shapes and achieve effect of fitting together perfectly, effectively limiting the fixed plate 504 to prevent it from unnecessary displacement or shaking on the bottom plate 501. A circular groove is formed on the fixed plate 504, a diameter of the circular groove is exactly equals to a diameter of the magnetic sticker 506, therefore, the magnetic sticker 506 can be placed exactly inside the circular groove. In order to ensure that the magnetic sticker 506 remains stable after disassembly and prevent it from accidentally falling out of the circular groove, the bottom cover 507 is specially mounted at the bottom of magnetic sticker 506, and the bottom cover 507 can provide reliable support and protection for the magnetic sticker 506.

Therefore, the magnetic sticker 506 is mounted in a specific position, which is at the top of the magnet sheet 12, such that the two magnets (that is, the magnetic sticker 506 and the magnet sheet 12) attract each other under the action of a magnetic field through natural magnetism between the magnets, thereby forming a stable and tight magnetic connection.

It is worth noting that the magnetic sticker 506 is mounted inside the actuator 5, such that when the actuator 5 needs to be detached, the magnetic sticker 506 that originally attracts the magnet sheet 12 through magnetic force will also be magnetically disconnected from the magnet sheet 12 as the actuator 5 is gradually separated from other components, the disconnection occurs due to the disassembly operation, which not only ensures that the actuator 5 is closely matched with the components through the magnetic force in normal mounting and use, and also ensures that it can be easily detached during disassembly without causing any problems caused by the magnetic force, such as disassembly difficulties or damages to the components due to the existence of magnetic force, providing convenience for the disassembly and maintenance of the entire device.

Figure 2:
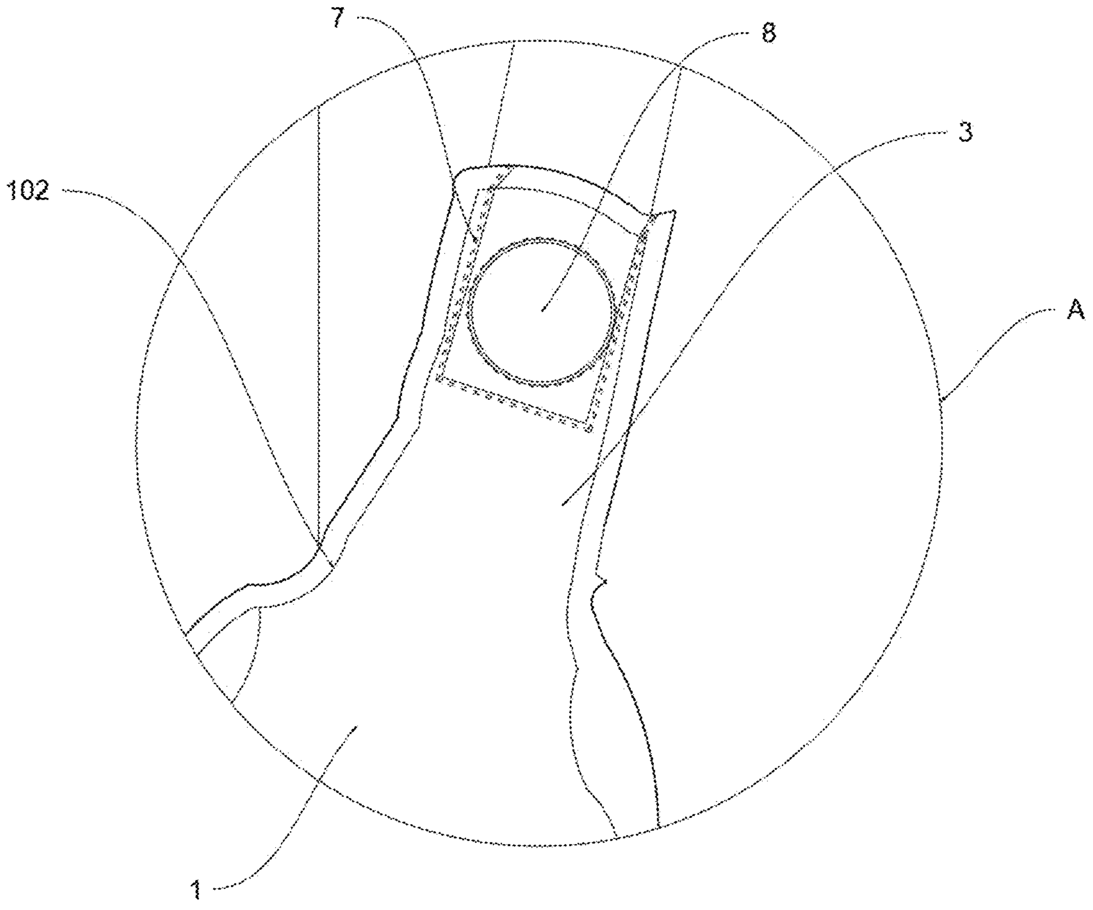
FIG. 2 is an enlarged schematic diagram of Position A in FIG. 1 of the present disclosure.
Figure 3:
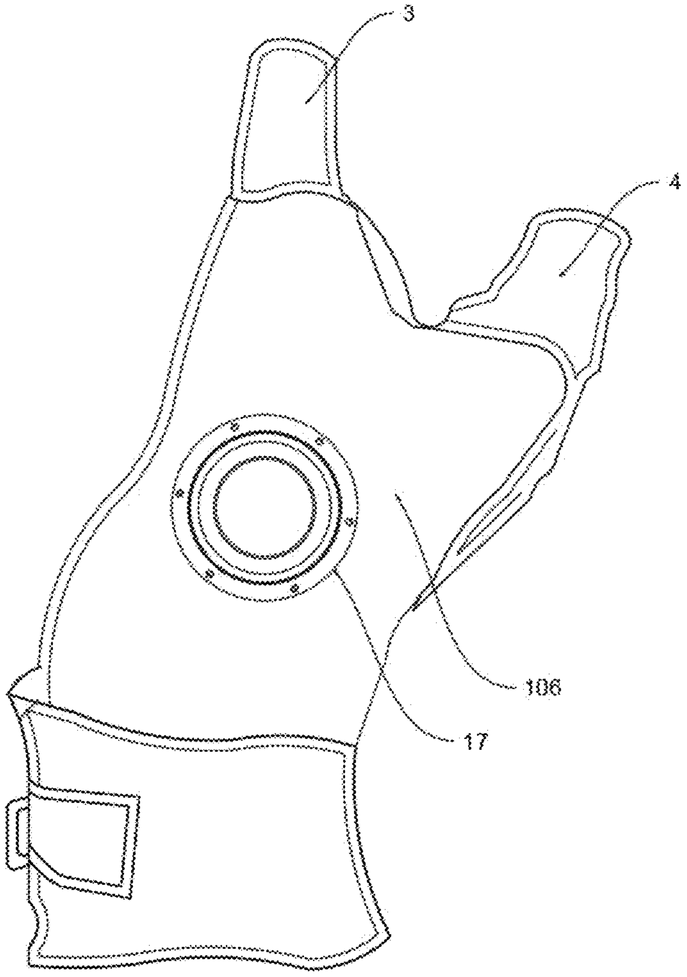
FIG. 3 is a plan view of a back of a hand illuminating assembly according to the present disclosure.
Figure 4:
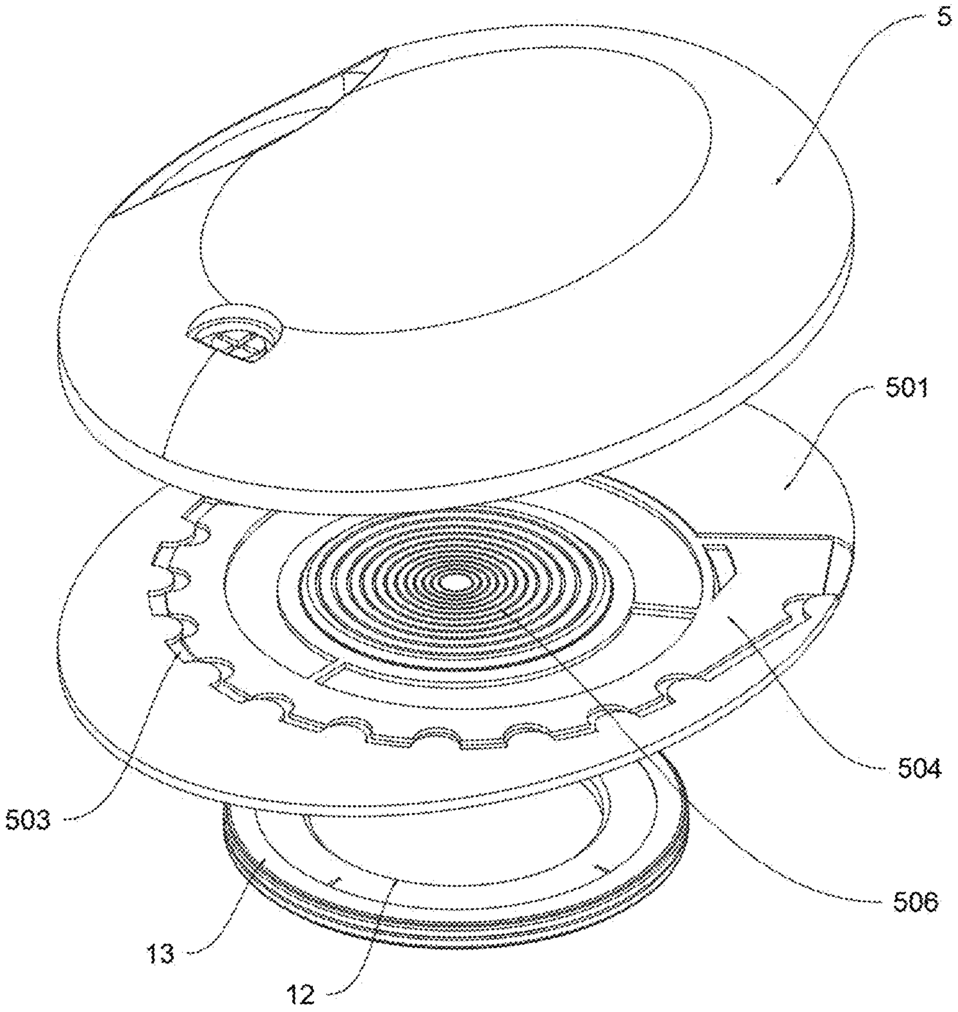
FIG. 4 is a schematic diagram of an exploded structure of an actuator according to the present disclosure.
Figure 5:
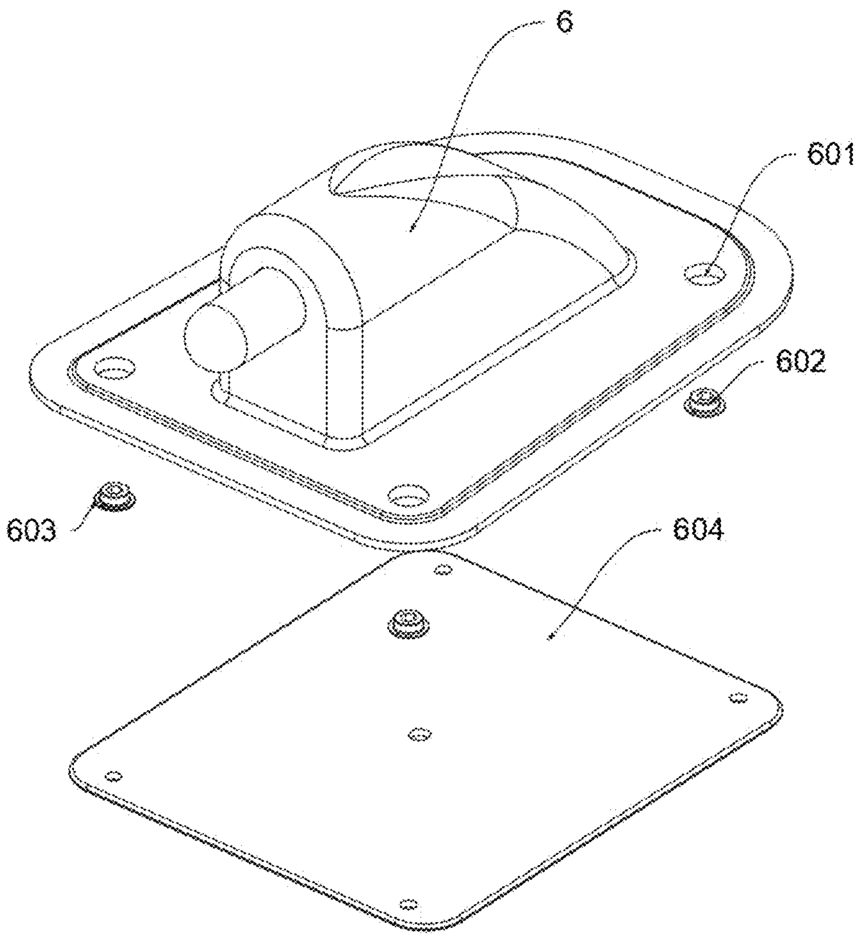
FIG. 5 is a schematic diagram of an exploded structure of a light emitter according to the present disclosure.
Figure 6:
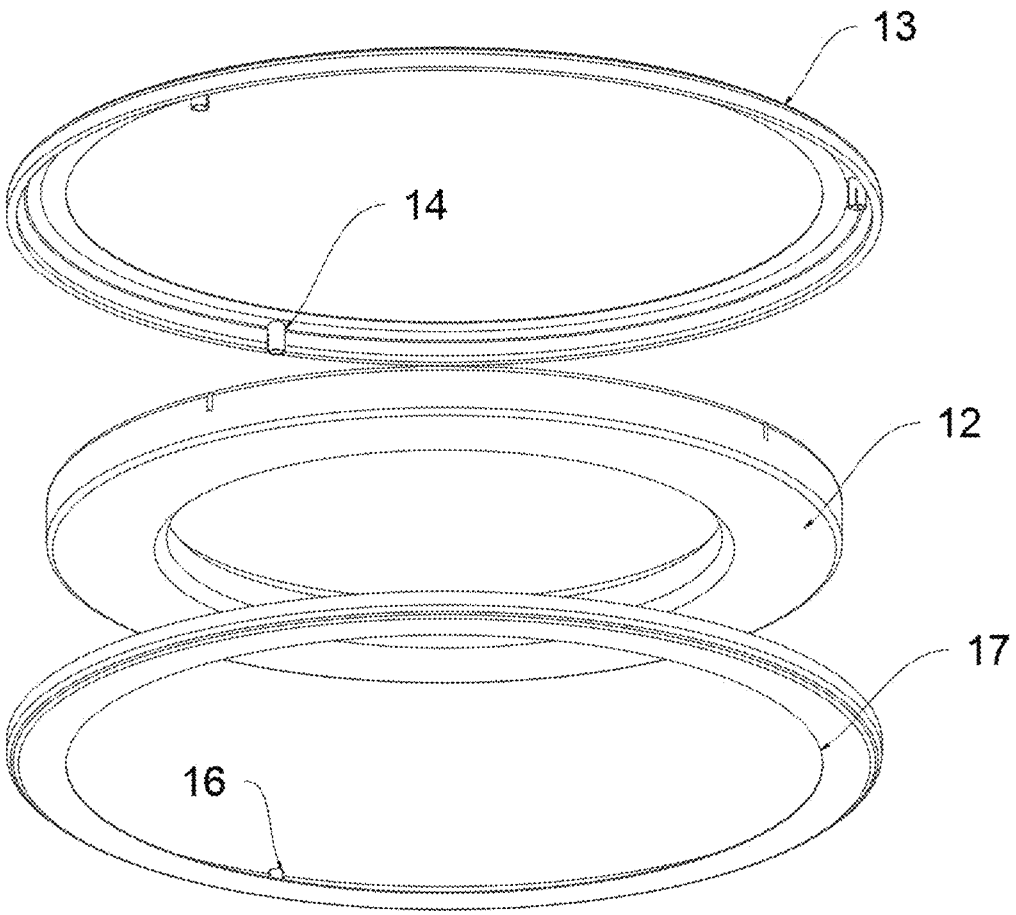
FIG. 6 is a structural schematic diagram of a magnet sheet according to the present disclosure.
Figure 7:
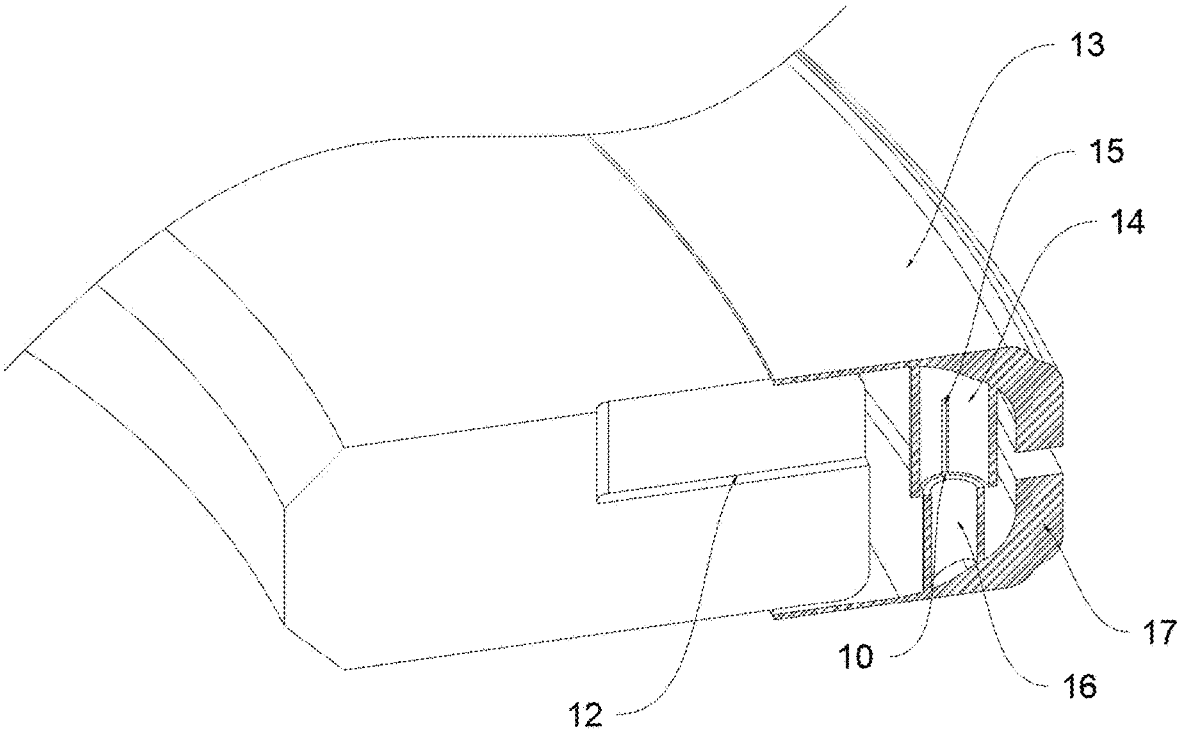
FIG. 7 is a sectional view between a pin and a column pin groove according to the present disclosure.
Figure 8:
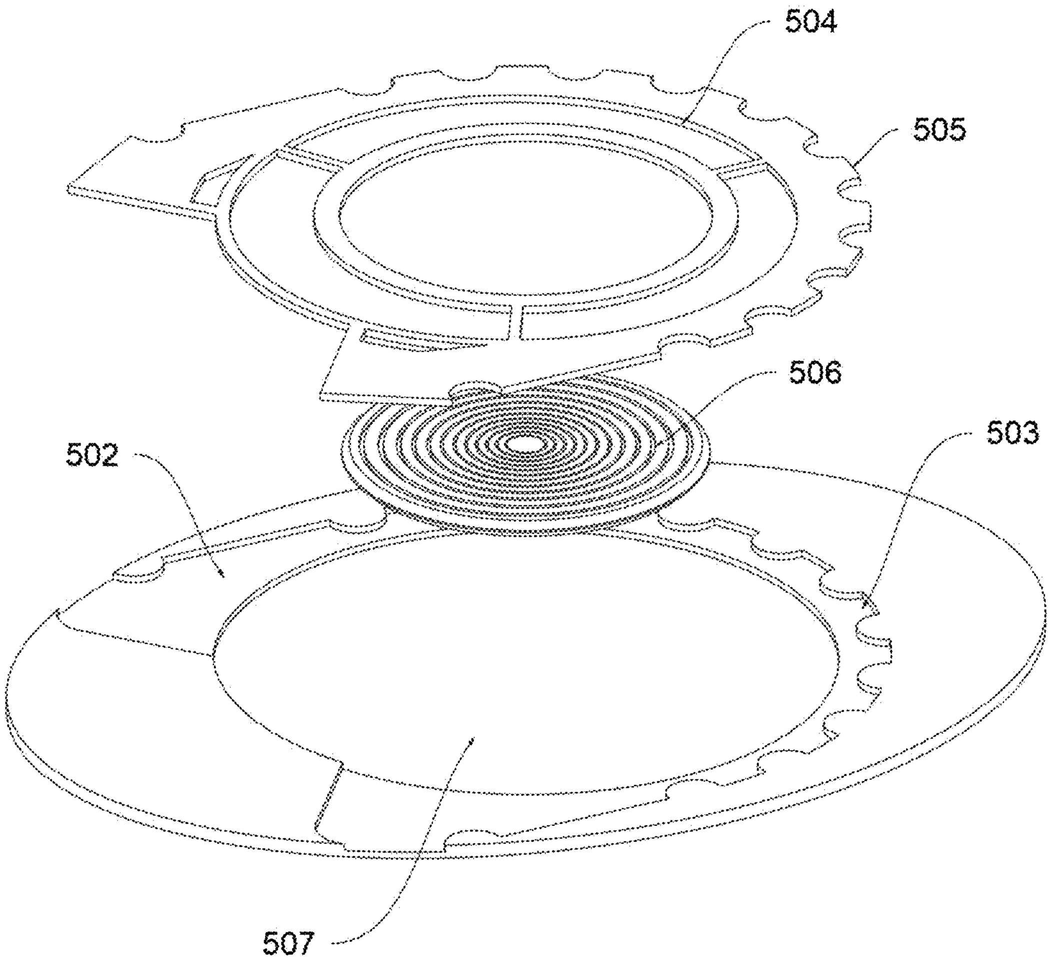
FIG. 8 is a schematic diagram of a structure on a bottom plate according to the present disclosure.

As shown in FIGS. 1, 2, and 5, the assembly includes a reference panel 1, the reference panel 1 has a first end 101, a second end 102, a first side 103, a second side 104, a top surface 105, and a bottom surface 106, an inner arc surface of the reference panel 1 is movably sleeved with a hand body 2, the reference panel 1 is arranged on a top of the hand body 2, a finger sleeve 3 is connected to the second end 102 of the reference panel 1, the finger sleeve 3 is located on one side of the first side 103, a hole capable of accommodating the hand body 2 is formed on a top of the finger sleeve 3, a thumb sleeve 4 is connected to the second side 104 of the reference panel 1, the thumb sleeve 4 is located on one side of the second end 102, a hole capable of accommodating the hand body 2 is also formed on a top of the thumb sleeve 4, the actuator 5 is connected to the top surface 105 of the reference panel 1, a light emitter 6 is connected to the top surface 105 of the thumb sleeve 4 and the finger sleeve 3, the light emitter 6 faces away from the first end 101 of the reference panel 1, the light emitter 6 is located near the second side 104, a magnetic block 8 is sewn inside the glove near two light emitters and the actuator 5, an iron sheet body 604 is mounted at a bottom of each of the two light emitters 6, a magnetic sticker 506 is arranged at a bottom of the actuator 5, sewing thread 7 is arranged on front ends of the thumb sleeve 4 and the finger sleeve 3 near an end surface of the second side 104, the sewing thread 7 is mounted on the first side 103, through holes 601 are formed at four corners of an upper surface of the light emitter 6, an inner arc surface of each of the through holes 601 is connected to a nut head 602 by means of through connection, an outer arc surface at a bottom end of the nut head 602 is sleeved with a gasket 603, a surface of the gasket 603 is placed inside the through hole 601, the iron sheet body 604 is fixedly mounted on the bottom end of the nut head 602, and the iron sheet body 604 is adsorbed and connected to the magnetic block 8.

Specifically, as shown in FIG. 2, when the sewing thread 7 is sewn on the finger sleeve 3 and the thumb sleeve 4 during sewing operation, specific technique of two-needle sewing is adopted. First, a distance between the two needles is carefully adjusted to be within a conventional range of two to eight millimeters, and the sewing thread 7 is then passed through the two needles. In an actual sewing process, the two needles move up and down simultaneously according to a set program, and continuously work at the second end 102 of the finger sleeve 3 and the thumb sleeve 4. Two parallel stitches are stably formed on a fabric surface through the coordinated operation. On one hand, the magnetic block 8 is cleverly and firmly fixed inside the finger sleeve 3 and the thumb sleeve 4, effectively preventing the magnetic block 8 from displacing or falling off; and on the other hand, the parallel stitches generated by the two-needle sewing also produce good decorative effect, greatly improving an overall aesthetics of the finger sleeve 3 and the thumb sleeve 4, and significantly increasing a structural strength of the edge portions of the same.

The light emitter 6 is placed at the second end 102. In a pre-mounting stage, the through holes 601 are formed on a surface of the light emitter 6, a main purpose of the through holes 601 is to facilitate easy mounting of the nut head 602 therein, and one end of the nut head 602 is connected to the iron sheet body 604; and a gasket 603 is also sleeved in a middle section of a connection between the nut head 602 and the iron sheet body 604, the presence of the gasket 603 can effectively enhance the stability of the connection between the nut head 602 and the iron sheet body 604, preventing the entire device from abnormal operation caused by looseness of a connection section. In addition, the gasket can reduce friction and wear between the nut head 602 and the iron sheet body 604, ensuring that the connected components can always maintain a good coordinated state throughout the operation of the light emitter 6, and guaranteeing the stability of the light emitter 6.

After mounting, the light emitter 6 is placed at a top position of the sewn magnetic block 8. The light emitter 6 and the magnetic block 8 are closely fitted together under the action of magnetic force to form a stable connection structure due to the magnetic attraction between the light emitter and the magnetic block. The magnetic connection method cannot only ensure that the light emitter 6 is firmly fixed in the corresponding position during normal use, avoiding displacement or falling off due to slight shaking or collision, and ensuring stable performance of light functions thereof. When it is necessary to disassemble the light emitter 6, the light emitter 6 can be easily detached from the top of the magnetic block 8 by applying external force on the light emitter 6 to eliminate the magnetic attraction between the light emitter and the magnetic block, the disassembly process require neither complex tools nor tedious operating steps, which greatly improves the convenience and efficiency of disassembly, and it is convenient for a user to quickly and easily complete the disassembly of the light emitter 6 in maintenance, replacement of parts of the device or other special demand scenarios.

The above-mentioned terms “front”, “back”, “left”, “right”, “top” and “bottom” are all defined relative to FIG.

1 of the accompanying drawings in the Specification. According to an observation angle of the person, the side of the device facing the observer is defined as the front, the left side of the observer is defined as the left, and so on.

In the description of the present disclosure, it is to be understood that the terms “central”, “longitudinal”, “transverse”, “front”, “back”, “left”, “right”, “vertical”, “horizontal”, “top”, “bottom”, “inner”, “outer”, etc. indicate azimuthal or positional relations on the basis of those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure.

The above shows and describes the basic principles, main features and advantages of the present disclosure. It should be understood by those skilled in the art that, the present disclosure is not limited by the embodiments described above. The embodiments described above and the descriptions in the description merely illustrate the principles of the present disclosure. Various changes and modifications may be made to the present disclosure without departing from the spirit and scope of the present disclosure. These changes and modifications all fall within the claimed scope of the present disclosure. The claimed scope of the present disclosure is defined by the appended claims and their equivalents.

What is claimed is:

1. A hand illuminating assembly, comprising a reference panel, wherein the reference panel has a first end, a second end, a first side, a second side, a top surface, and a bottom surface, wherein an inner arc surface of the reference panel is configured to be movably sleeved with a hand body, the reference panel is configured to be arranged on a top of the hand body; wherein a finger sleeve is connected to the second end of the reference panel, the finger sleeve is located on a first side of the second end, a hole capable of accommodating a finger of the hand body is formed through the finger sleeve; wherein a thumb sleeve is connected to the second side of the reference panel, the thumb sleeve is located on a second side of the second end, and a hole capable of accommodating a thumb of the hand body is formed through the thumb sleeve; wherein an actuator is connected to the top surface of the reference panel, a two light emitters are connected to the top surface of the reference panel, wherein one light emitter of the two light emitters is connected to the thumb sleeve and another light emitter of the two light emitters is connected to the finger sleeve, wherein the two light emitters each face away from the first end of the reference panel, wherein the two light emitters are located on the second end of the reference panel; wherein three magnetic blocks are connected to the reference panel, a magnetic block of the three magnetic blocks is sewn inside the reference panel near the two light emitters and the actuator, respectively; and two iron sheet bodies, an iron sheet body of the two iron sheet bodies is mounted at a bottom of each of the light emitters, respectively; and a magnetic sticker is arranged at a bottom of the actuator; wherein sewing thread is mounted on front ends of the thumb sleeve and the finger sleeve, wherein the sewing thread is mounted on the first side, and through holes are formed at four corners of an upper surface of at least one of the plurality of light emitters.

2. The hand illuminating assembly according to claim 1, wherein an inner arc surface of each of the through holes is connected to a nut head, an outer arc surface at a bottom end of each of the nut heads is sleeved with a gasket, and a surface of each of the gaskets is placed inside the respective through hole.

3. The hand illuminating assembly according to claim 2, wherein a respective iron sheet body of the two iron sheet bodies is fixedly mounted on the bottom end of the nut heads, and the respective iron sheet body is adsorbed and connected to the respective magnetic block of the three magnetic blocks.

4. The hand illuminating assembly according to claim 1, wherein the two light emitters are turned on or off when the actuator is triggered, the actuator is connected to the reference panel of the hand illuminating assembly, and a bottom plate is fixedly mounted on a lower surface of the actuator.

5. The hand illuminating assembly according to claim 4, wherein a supporting groove is formed on an upper surface of the bottom plate, a convex surface is formed on an outer arc surface of the supporting groove, an upper surface of the supporting groove is movably overlapped with a fixed plate, and a supporting portion is formed on an outer arc surface of the fixed plate.

6. The hand illuminating assembly according to claim 5, wherein an outer arc surface of the supporting portion is overlapped with the convex surface, the magnetic sticker is connected with an upper surface of the fixed plate, a lower surface of the magnetic sticker is connected with a bottom cover, and the bottom cover is fixedly mounted on the bottom plate.

7. The hand illuminating assembly according to claim 6, wherein an upper cover plate is fixedly mounted on the top surface of the reference panel, a column pin groove is formed on a lower surface of the upper cover plate, a snap-fit slot is formed on a bottom end of an outer arc surface of the column pin groove, and a pin is connected with an inner arc surface of the snap-fit slot.

8. The hand illuminating assembly according to claim 7, wherein an insertion block is arranged on each side of an outer arc surface of the pin, both ends of the insertion block pass through and extend into the column pin groove, a lower cover plate is arranged at a bottom end of the pin, and an upper surface of the lower cover plate is placed on the bottom surface of the reference panel.

9. The hand illuminating assembly according to claim 8, wherein a magnet sheet is sandwiched and connected between the upper cover plate and the lower cover plate, the magnet sheet is adsorbed and connected to the magnetic sticker, the upper cover plate is placed on the top surface, the lower cover plate is placed on the bottom surface, and the upper cover plate is connected to the lower cover plate in a clamping manner.

* * * * *